United States Patent [19]
Hewitt

[11] Patent Number: 5,819,703
[45] Date of Patent: Oct. 13, 1998

[54] VEHICLE SPEED LIMITING SYSTEM

[76] Inventor: John T. Hewitt, 30760 Tarapaca Rd., Rancho Palos Verdes, Calif. 90274

[21] Appl. No.: 868,276

[22] Filed: Jun. 3, 1997

Related U.S. Application Data

[63] Continuation-in-part of Ser. No. 672,681, Jun. 28, 1996.
[51] Int. Cl.⁶ .................................................... F02D 33/00
[52] U.S. Cl. ............................................................ 123/332
[58] Field of Search ............................. 123/332, 198 DB, 123/461, 333, 357; 74/482; 367/57

[56] References Cited

U.S. PATENT DOCUMENTS

| | | | |
|---|---|---|---|
| 2,398,878 | 4/1946 | Bolli | 123/332 |
| 3,902,076 | 8/1975 | Meyers et al. | 307/57 |
| 3,916,853 | 11/1975 | Lombard | 123/332 |
| 3,948,116 | 4/1976 | Van Pelt | 74/482 |
| 4,294,204 | 10/1981 | Hurner | 123/198 DB |
| 4,925,196 | 5/1990 | Green et al. | 180/170 |

FOREIGN PATENT DOCUMENTS

| | | | |
|---|---|---|---|
| 57-143141 | 9/1982 | Japan | 123/332 |

*Primary Examiner*—Raymond A. Nelli
*Attorney, Agent, or Firm*—J. F. McLellan

[57] ABSTRACT

A vehicle speed limiting system for a vehicle having an engine which includes a plurality of fuel injectors coupled to a low volume fuel injection pump operative to successively trigger a flow of fuel directly to the individual fuel injectors. The vehicle speed is converted to a speed signal which, when it reaches a preset limit, is utilized by the system control to close a fuel control valve through which fuel normally passes to the injection pump. The system is characterized by a low fuel residual upon cutoff by the fuel control so that the engine speed is quickly slowed for lack of fuel.

8 Claims, 5 Drawing Sheets

VEHICLE SPEED LIMITING SYSTEM

REFERENCE TO PRIOR APPLICATION

This application is a continuation-in-part of pending application Ser. No. 08/672,681 filed Jun. 28, 1996.

FIELD OF THE INVENTION

The present invention relates to a vehicle speed limiting system for a vehicle having an injection pump, the system being operative to control the speed over a preset limit by cutting off all fuel flow to the fuel injection pump except for a predetermined amount necessary to prevent fuel injection pump cavitation.

BACKGROUND OF THE INVENTION

There are many reasons for limiting the speed of an engine over a preset limit. Legal speed limits, fuel economy and safety considerations are among the important factors, particularly in connection with the operation of heavy duty vehicles or trucks.

Various systems have been advanced for achieving engine speed limitation in such vehicles. Those of particular pertinence to the present invention are compression ignition or diesel engines having inline or rotary fuel injection pumps. Such pumps are operative to successively trigger a flow of fuel directly to the individual injectors.

This is in contrast to a diesel engine such as a Cummins engine characterized by a common rail line having a relatively high fuel pressure constantly applied to all of the engine injectors. The flow of fuel to each individual injector is mechanically done at the engine by a push rod actuated by a cam or cam shaft.

U.S. Pat. No. 4,245,698 issued to Ruhl discloses a system for limiting the maximum speed of trucks by blocking fuel flow to the engine by means of a normally closed solenoid valve connected between the fuel rail and the fuel tank. When the valve is open it permits fuel flow to bypass the engine, thereby reducing fuel flow to the engine. The normally closed valve only opens when the truck speed exceeds acceptable limits.

A system similar to Ruhl is disclosed in U.S. Pat. No. 4,862,849, issued to Wilson. It also operates to bypass fuel to slow the engine.

A fuel limitation system is also disclosed in U.S. Pat. No. 4,422,420, issued to the inventor of the present invention. It accomplished fuel limitation by means of a solenoid valve connected between the fuel pump and the fuel rail. This valve was normally open and was only closed when the speed exceeded the desired limit.

Bypass systems depend upon depriving an engine of fuel. However, on shut off there is residual fuel in the fuel rail and in the Cummins type injection pump, all of which must be bypassed before the engine will slow. Bypassing such fuel requires an unacceptable amount of time, and it is therefore not practicable to quickly slow an engine by gradually starving it of fuel.

In contrast, a rotary pump or the Bosch type injection pump are low volume pumps, the volume of fuel in each pump being measured in ounces.

SUMMARY OF THE INVENTION

According to the present invention, the vehicle speed limiting system is used with an inline or rotary low volume injection pump which is operative to successively trigger a flow of fuel directly to the individual fuel injectors. A fuel control means is disclosed having a fuel control valve located in the fuel supply line to the pump.

Control means are employed to maintain the fuel control valve open to allow normal fuel flow to the injection pump.

An engine speed sensing means produces a speed signal representative of engine speed. When the signal indicates the engine has reached a speed above a preset limit, the control means closes the fuel control valve. In an embodiment utilizing an inline pump, which requires a relatively high supply pump pressure, the control means also actuates a pressure regulator means to open a pressure regulator valve in the line extending from the fuel control valve to the return fuel line which empties into the fuel supply.

The shutoff of fuel on closure of the fuel control valve is complete except for the small amount of residual fuel in the low volume injection pump, and except for a small amount of fuel which is allowed by the fuel control means to feed into the injection pump. A constant flow of this small amount of fuel is insured by the regulation of the high supply pump pressure by the pressure regulator means.

The amount of fuel passed is just sufficient to prevent pump cavitation. With this arrangement the engine immediately begins to slow relatively imperceptibly.

In the case of the inline pump embodiment, when the speed drops by, for example, one to two miles per hour, a reverse operation occurs. The fuel control valve opens and the pressure regulator valve closes, and normal fuel flow occurs.

The low volume pump is preferably the Bosch type of inline pump, or a rotary pump. Each of these is connected directly to the individual injectors rather than to a fuel rail or the like.

In an embodiment utilizing a rotary pump, the relatively low fuel supply pressure which characterizes a rotary pump system eliminates any need for a pressure regulator means. The small amount of fuel allowed by the fuel control means to feed into the rotary pump is inherently consistent or constant at low pressure.

DESCRIPTION OF PREFERRED EMBODIMENT

Figure 1:
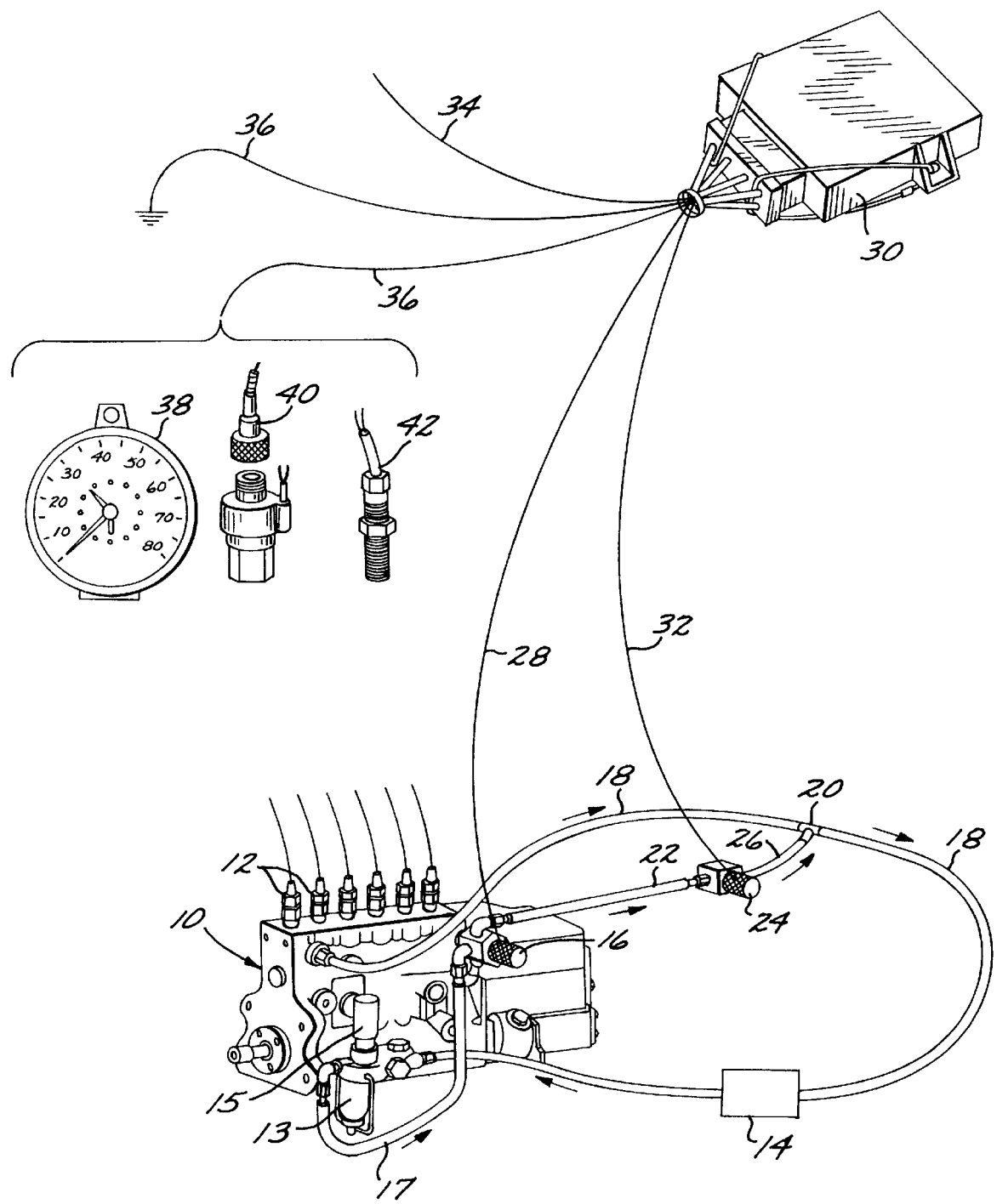
FIG. 1 is a generally schematic view of the various components of the present invention in an inline injection pump embodiment.

Referring to the drawings, and particularly to FIG. 1, one embodiment of the present vehicle speed limiting system includes a low volume inline fuel injection pump 10, a sample of which is the Bosch type injection pump. The pump 10 is associated with a diesel engine (not shown) of the type commonly used in large trucks or the like.

The pump 10 includes a plurality of fuel injectors 12, and is operative to supply fuel successively to the individual injectors under the control of a cam shaft or the like (not shown).

Fuel is supplied by a lift or supply pump 13 which draws fuel from a fuel supply or tank 14 and pumps it through a conventional filter and hand pump assembly 15 that is coupled by a connecting conduit to a normally open fuel control 16. The fuel control 16 will be described in further detail in conjunction with FIG. 4.

The fuel control 16 supplies fuel to the inline injector pump 10 for successive distribution to the individual fuel injectors 12, as will be apparent to those skilled in the art.

The inline injection pump 10 is coupled to a return line 18 which includes a T-fitting 20. Downstream from the fitting 20 the return line empties into the fuel tank 14.

The fuel control 16 is also coupled by means of a conduit 22 to a normally closed pressure regulator 24 which in turn is coupled by a conduit 26 to the T-fitting 20.

The fuel control 16 is electrically coupled by an electrical lead 28 to an electronic system control generally indicated at 30. In similar fashion the pressure regulator is electrically coupled by an electrical lead 32 to the system control 30.

The system control 30 derives power through an electrical lead 34 which is connected to the vehicle ignition switch (not shown). Vehicle voltage is regulated to 8 volts with reverse polarity protection. The system control is grounded through an electrical lead 36.

The system control 30 is responsive to a speed signal by means of a conventional comparator circuit (not shown). When the speed signal is equal to the preset level of the comparator, a signal is transmitted to a 10 ampere capacity single pole double throw relay (not shown) forming a part of the control 30. The relay de-energizes and sends signals through the leads 28 and 30, respectively, to close a valve of the fuel control 16 and to open a valve of the pressure regulator 24, and thereby place the vehicle speed limiting system in its speed limiting mode.

When the vehicle speed is reduced approximately 1 to 2 miles per hour below the compared set point, the relay is again energized, sending signals to the fuel control 16 to open, and to the pressure regulator 24 to close, returning normal fuel supply to the fuel injection pump 10.

The speed signal may be derived from any one of several speed sensing means, such as the diagrammatically indicated commercially available tachograph 38, a magnetic pickup 40 mounted in the vehicle flywheel housing (not shown) to sense engine RPM or in the final drive of the transmission (not shown), or a conventional signal generator 42 mounted in-line of the vehicle speedometer cable (not shown). The speed signal passes to the system control 30 by means of an electrical lead 36 connected to the selected speed sensing means.

Figure 4:
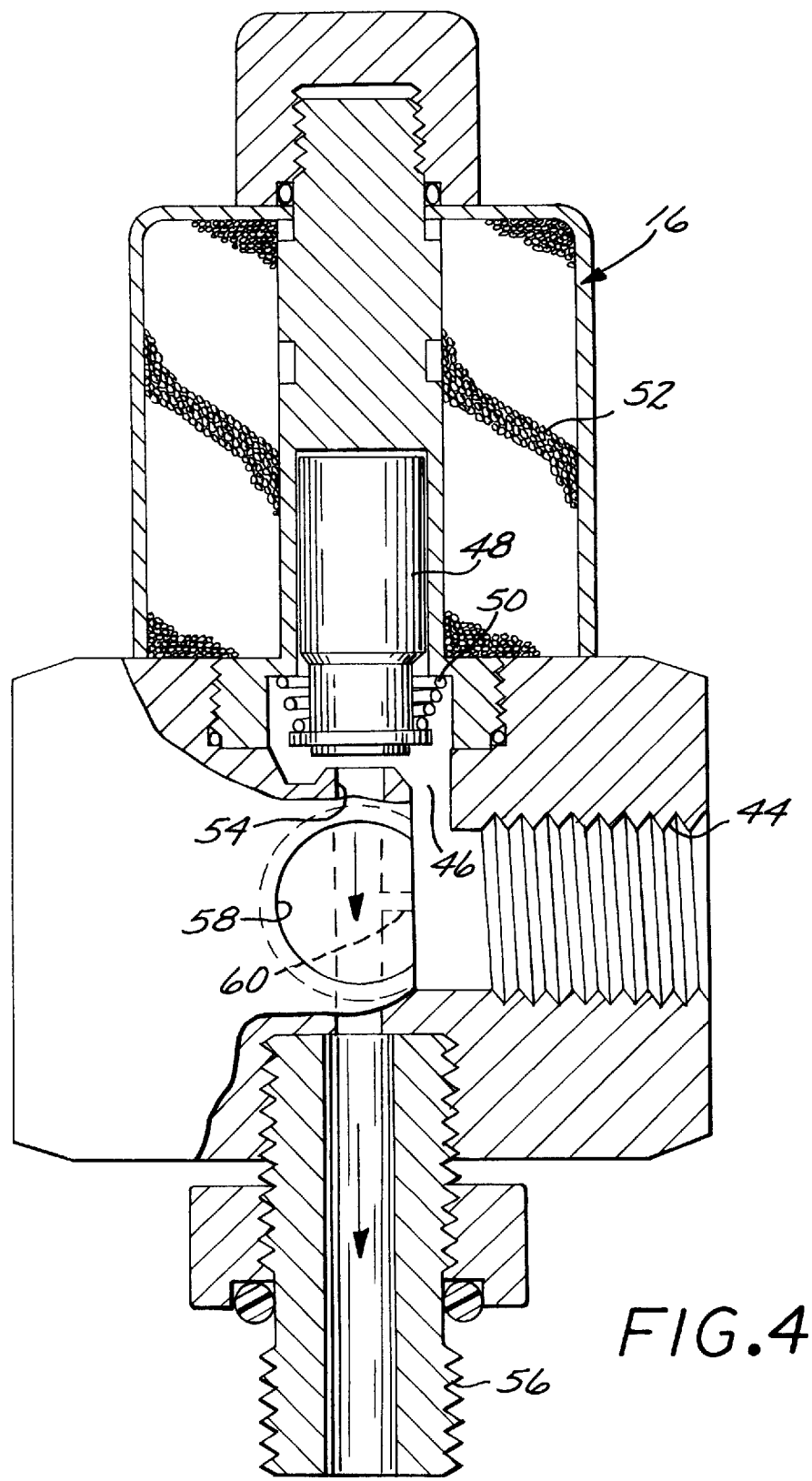
FIG. 4 is an enlarged longitudinal cross sectional view of the fuel control means, illustrating the fuel control valve in its normally open position.

Referring now to FIG. 4, the fuel control 16 is illustrated in its open position in which fuel from the conduit 17 passes through an inlet port 44 of the fuel control 16, and through a relatively large passageway 46. The passageway 46 extends across the underside of a plunger 48 which is raised to the illustrated position against the bias of a spring 50 upon energization of a surrounding solenoid 52.

The passageway 46 communicates with a central bore 54 which connects with a port fitting 56 adapted to thread into a complemental threaded opening (not shown) in the inline fuel injection pump 10. The fuel control 16 also includes an outlet port 58 which opens into the conduit 22 which is connected to the pressure regulator 24.

An important feature of the fuel control valve 16 is the provision of a small passageway or orifice 60 which is quite small, in the order of 0.020 inches. When the solenoid 52 is de-energized, and the valve or plunger 48 is released to cover and block the upper end of the bore 54, the valve 16 is closed and fuel can no longer flow through the bore 54 to the fuel injection pump. However, the fuel to the inline fuel injection pump is not completely cut off because a very small amount continues to flow through the orifice 60 to the pump. The size of the orifice is calculated such that the small amount of fuel passing through it is sufficient so that cavitation will not occur.

When the fuel control valve 16 has closed, the pressure regulator 24 is open, as previously indicated, so that a constant supply pressure is maintained to control the fuel volume supplied through the orifice 60.

Figure 2:
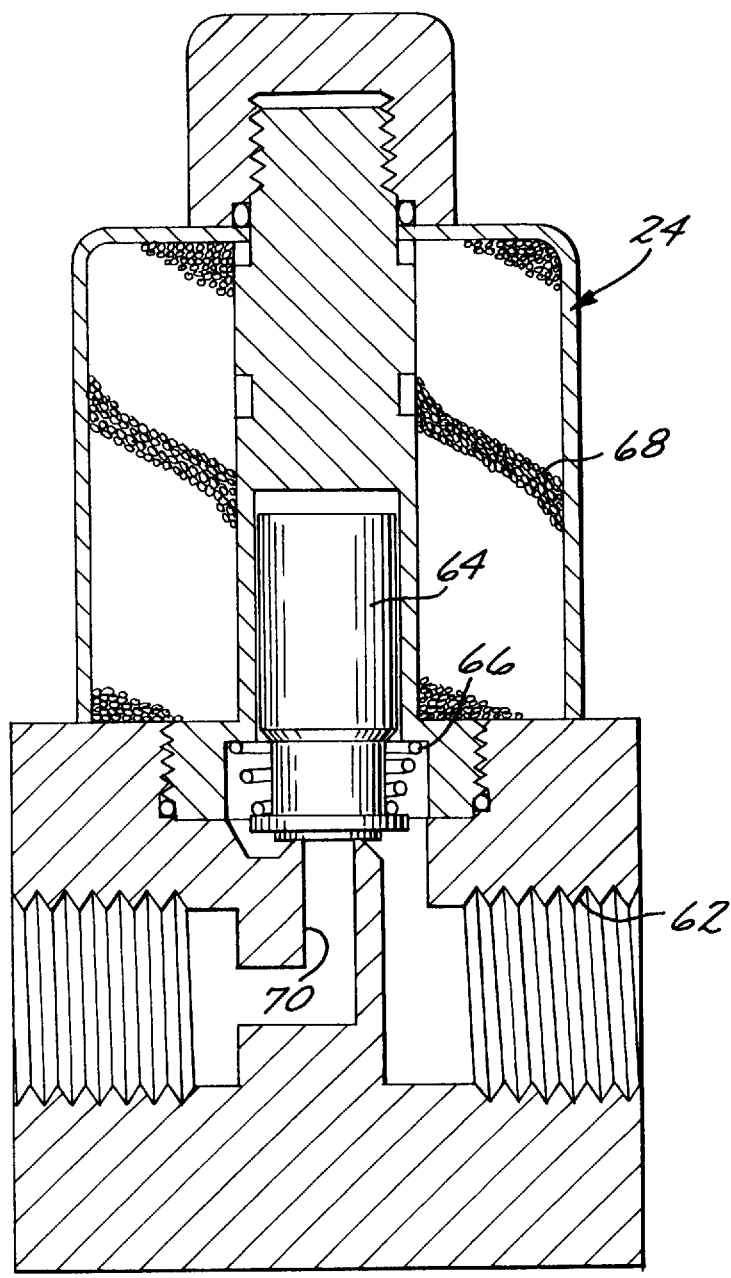
FIG. 2 is an enlarged longitudinal cross sectional view of the pressure regulator means illustrated in FIG. 1, showing the pressure regulator valve in its normally closed position.
Figure 3:
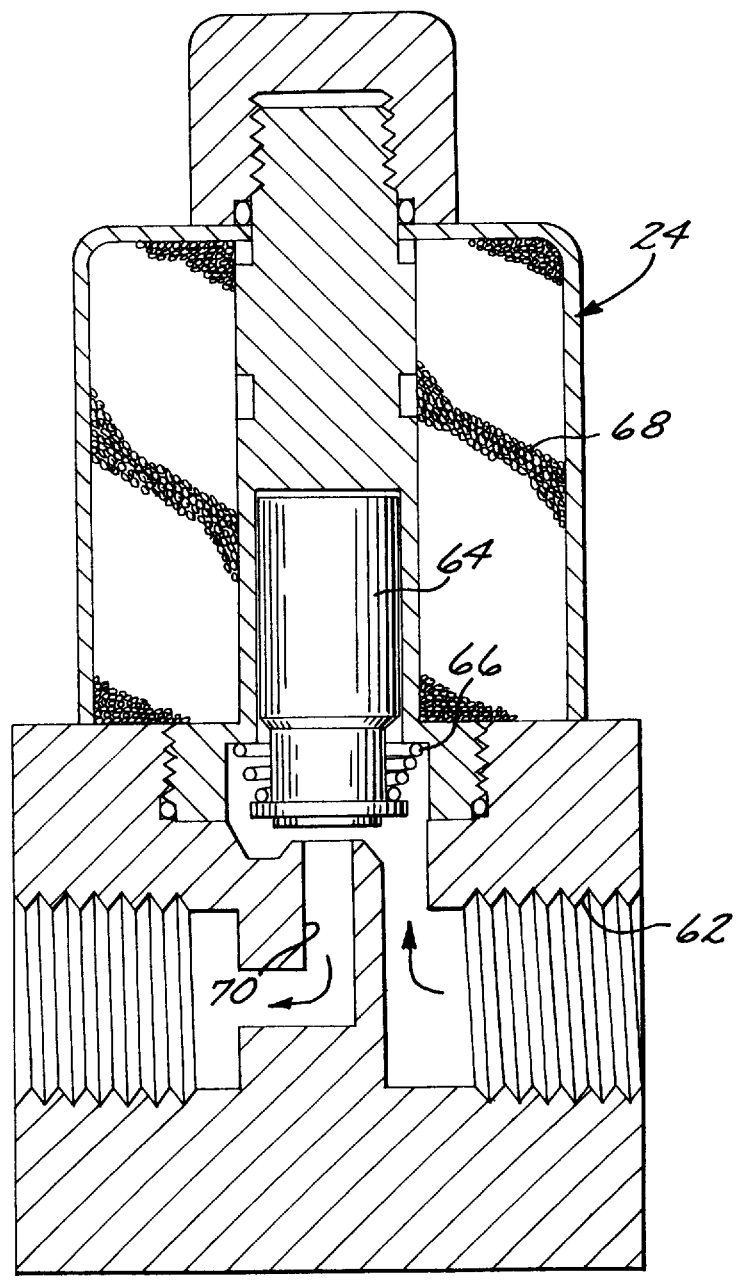
FIG. 3 is a view similar to FIG. 2, but illustrating the pressure regulator valve in its open position.

Referring now to FIGS. 2 and 3, the pressure regulator 24 includes an inlet port 62 which receives the conduit 22 which is connected to the fuel control valve 16. The regulator includes a valve or plunger 64 which is raised against the bias of a spring 66 upon energization of a surrounding solenoid 68. In its raised position, as shown in FIG. 3, fuel flows across the underside of the plunger 64 and into a central bore 70 in communication with an outlet port 72 which receives the conduit 26 that is coupled to the return line 18.

Upon de-energization of the solenoid 68, the plunger 64 drops to close off the bore 70, thereby cutting off any fuel flow from the fuel control valve 16 to the return line 18.

Summarizing the foregoing, when the system control 30 senses a speed signal equal to the preset limit, it signals the fuel control valve 16 to close and the pressure regulator 24 to open. In the closed position of the valve 16, the metering orifice 60 allows a predetermined amount of fuel to be supplied to the inline injection pump to prevent pump cavitation, but there is sufficient cutoff of fuel to result in vehicle speed limitation.

The pressure regulator 24 is precisely orificed to regulate the supply pressure required to maintain a consistent fuel flow through the metering orifice 60 as needed for fuel flow balance during the speed limitation mode.

When the vehicle speed drops by about 1 to 2 miles per hour, the system control 30 signals the fuel control valve 16 to open and the pressure regulator 24 to close, restoring normal fuel flow.

If the vehicle speed again increases to the preset limit, the cycle is repeated and no amount of throttle depression will cause the vehicle speed to exceed the speed limit setpoint, except on a downhill grade. As the speed limit point is reached, the reduction of power is smooth, and the return cycle is similar to a normal accelerator advancement.

Figure 5:
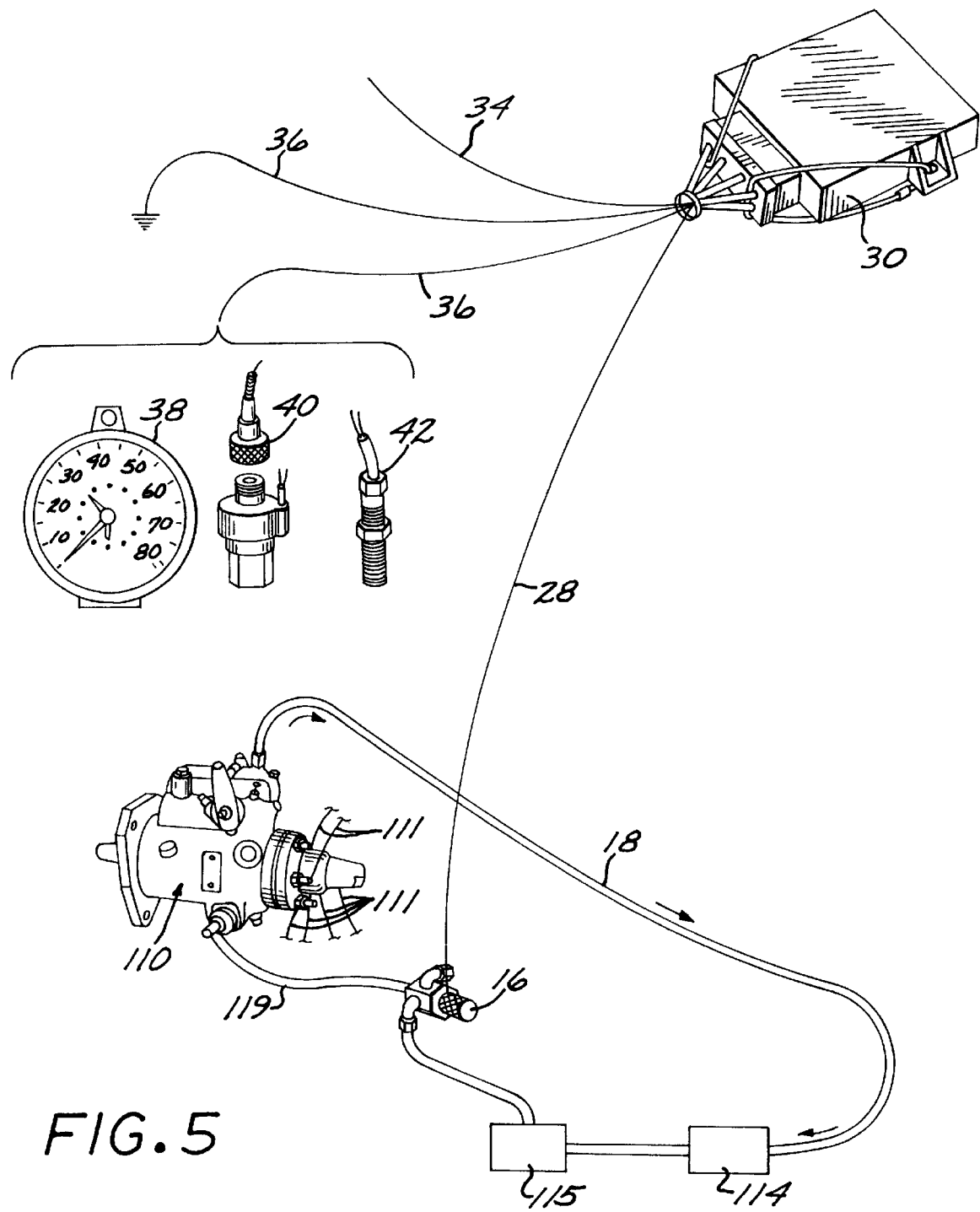
FIG. 5 is a generally schematic view of the various components of the present invention in a rotary pump embodiment.

The second embodiment of the present invention illustrated in FIG. 5 is substantially identical to the first embodiment just described in conjunction with FIGS. 1–4.

Identical numerals are employed in FIG. 5 and in the following description where the components of the respective embodiments are identical. Where the components are not identical but are substantially similar in function, one hundred is added to the two digit numerals of the first embodiment so that, for example, 10 becomes 110.

The second embodiment of FIG. 5 comprises a rotary injection pump 110 instead of the inline injection pump 10. Like the pump 10, the pump 110 is also a low volume fuel pump. It is coupled to a relatively low pressure fuel supply system comprising a fuel tank 114 and conventional fueled filter 115. The fuel supply pressure is in the order of 5 to 7 pounds per square inch.

The fuel control valve 16 is coupled to an output port of the fuel filter 115 as illustrated.

The rotary pump 110 includes fuel output conduits 111 connected, respectively, to the individual fuel injectors (not shown) of the associated diesel engine.

The output from the fuel control valve 16 is carried to the rotary pump 110 by an inlet conduit 119.

There is no pressure regulator valve in the system, and accordingly the conduit 22, pressure regulator 24, conduit 26 and T-fitting 20 of the first embodiment are omitted, and instead the fuel control 16 discharges only into the rotary pump 110.

Summarizing the operation of this second embodiment, when the system control 30 senses a speed signal equal to the preset limit, it signals the fuel control 16 to close. In the closed position of the valve 16, the metering orifice 60, as seen in FIG. 4, allows a predetermined amount of fuel to be supplied to the rotary pump 110, but there is sufficient cutoff of fuel to result in vehicle speed limitation. The low fuel supply pressure enables a consistent fuel flow through the metering orifice 60, as needed for fuel flow balance during the speed limitation mode, despite the absence of a pressure regulator valve.

As seen in the first embodiment, when the vehicle speed drops by about 1 to 2 miles per hour, the system control 30 signals the fuel control 16 to open, restoring normal fuel flow.

If the vehicle speed again increases to the preset limit, the cycle is repeated and no amount of throttle pressure will cause the vehicle speed to exceed the speed limit setpoint, except on a downhill grade. As the speed limit setpoint is reached, the reduction of power is smooth, and the return cycle is similar to a normal accelerator advancement.

Although preferred embodiments of the invention have been described herein, it will be apparent to those skilled in the art that variations may be made in the invention without departing from the spirit of the invention or the scope of the appended claims.

It is claimed:

1. A vehicle speed limiting system for a vehicle having an engine which includes a plurality of fuel injectors; fuel supply means adapted to supply fuel at a relatively low supply pump pressure; and an injection pump operative to successively trigger a flow of fuel directly to the individual fuel injectors, the system comprising:

speed sensing means for producing a speed signal related to the engine speed;

fuel control means for metering fuel flow to the engine, the fuel control means being coupled to the fuel supply means and to the injection pump, the fuel control means including a first passageway between the fuel supply means and the injection pump, and also a second passageway smaller than the first passageway between the fuel supply means and the injection pump, the fuel control means normally being in an open state allowing fuel flow through the first passageway, the fuel control means including a valve actuable to a closed state preventing fuel flow through the first passageway and allowing fuel flow only through the second passageway; and system control means operative to place the fuel control valve in the open state, and further operative in response to a speed signal in excess of a preset limit to place the fuel control valve in the closed state whereby fuel flow to the injection pump is confined to the second passageway in the fuel control means.

2. A speed limiting system according to claim 1 wherein the injection pump is a low volume rotary type characterized by a low residual amount of fuel between the injection pump and the injectors upon placement of the fuel control means in the closed state.

3. A speed limiting system according to claim 1 wherein the engine is a diesel engine.

4. A speed limiting system according to claim 1 wherein the speed signal is provided by a tachograph.

5. A speed limiting system according to claim 1 wherein the speed signal is provided by a signal generator.

6. A speed limiting system according to claim 1 wherein the speed signal is provided by a magnetic sensor.

7. A speed limiting system according to claim 1 wherein the fuel control means includes a fuel control valve having a solenoid energizable by the system control means to place the fuel control means in the open state.

8. A special limiting system according to claim 1 wherein the second passageway is an orifice approximately 0.020 inch in diameter.

* * * * *